May 11, 1948. D. C. BOREN 2,441,466
FARM IMPLEMENT
Filed May 1, 1946 3 Sheets-Sheet 1

Inventor
Dock C. Boren
By Randolph & Beavers
Attorneys

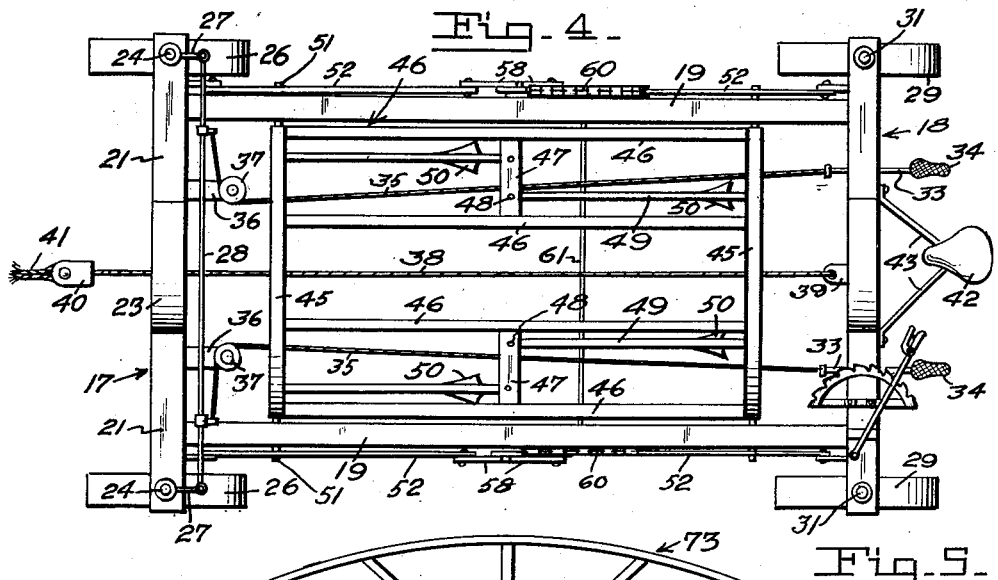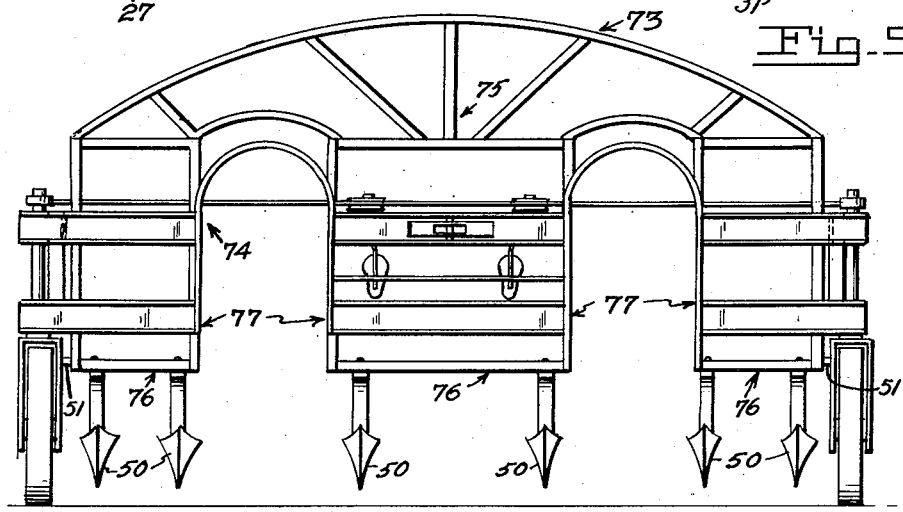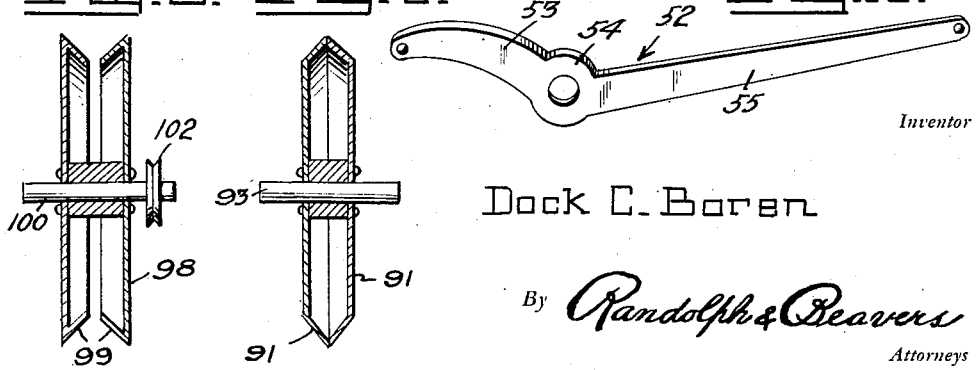

May 11, 1948.  D. C. BOREN  2,441,466
FARM IMPLEMENT
Filed May 1, 1946  3 Sheets-Sheet 3
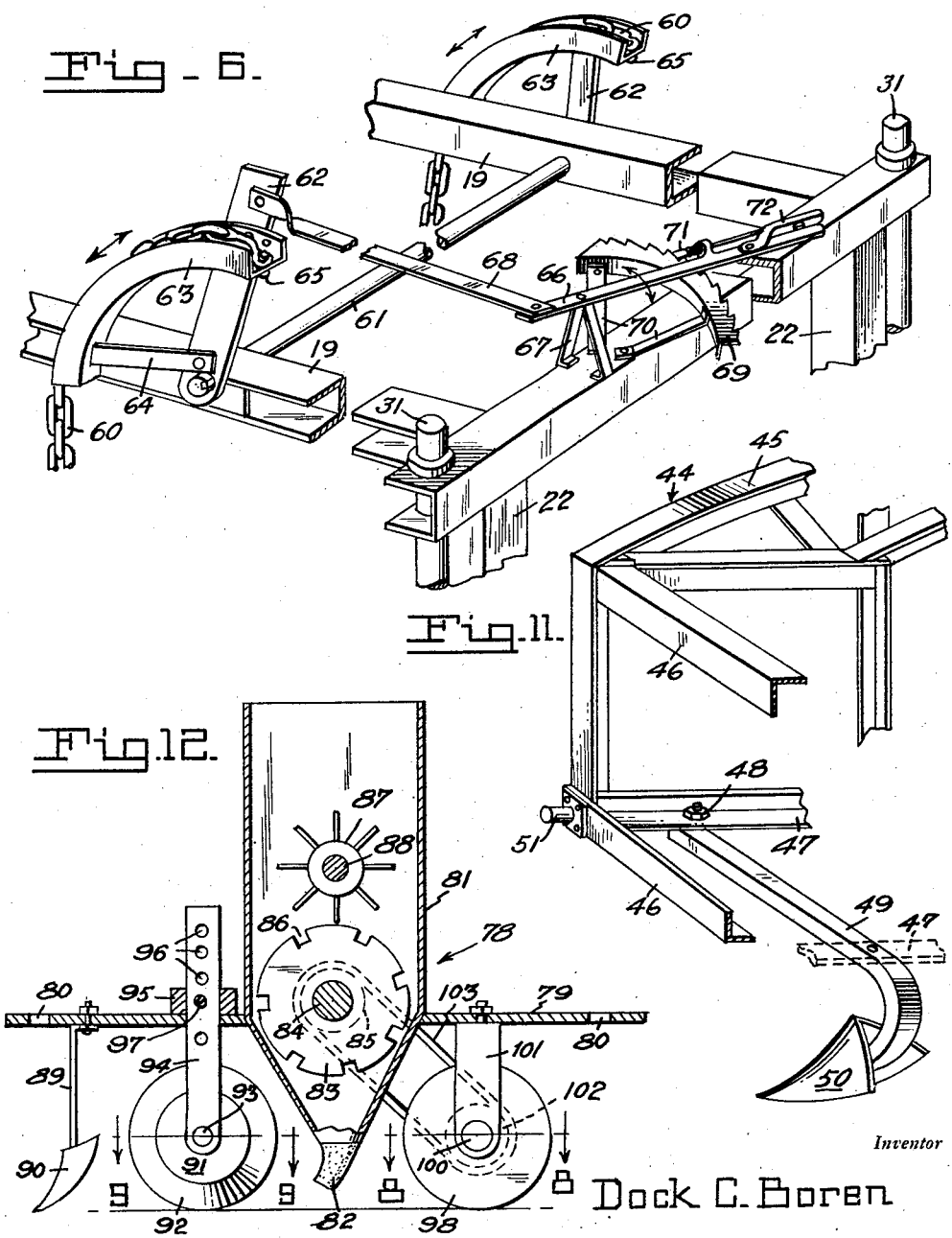
Inventor
Dock C. Boren
By Randolph & Beavers
Attorneys Patented May 11, 1948

2,441,466

UNITED STATES PATENT OFFICE 2,441,466

FARM IMPLEMENT

Dock C. Boren, Iowa Park, Tex.

Application May 1, 1946, Serial No. 666,448

5 Claims. (Cl. 97—237)

This invention relates to a novel construction of farm implement capable of being utilized for substantially all operations incident to preparing the soil, planting and cultivating of crops.

More particularly, it is an object of the invention to provide a farm machine capable of being drawn by any suitable draft means and which can be readily operated by one man, riding thereon, for steering the machine and for controlling the operation of the soil engaging implement being utilized.

A further and particular object of the invention is to provide a unique construction of machine or implement including a chassis frame equipped with supporting ground engaging wheels and a separate implement carrying frame supported by the ground engaging wheels and adjustable with respect to the chassis frame.

Still another object of the invention is to provide an implement frame of the afore-described character to which a plurality of plows, seed planters and other soil engaging means may be interchangeably applied to operate in conjunction therewith.

Numerous other objects and advantages of the invention will hereinafter become more fully apparent from the following description of the drawings, which illustrate a preferred embodiment thereof, and wherein:

Figure 4 is a top plan view of the machine;

Figure 5 is a front elevational view of another embodiment of the machine for use as a multiple planter or cultivator;

Figure 6 is an enlarged perspective view of a portion of the chassis frame;

Figure 8 is a transverse vertical sectional view of a seed row covering wheel;

Figure 9 is a diametric sectional view of a seed furrow opening disc;

Figure 10 is a perspective view of one of the implement frame supporting levers;

Figure 11 is a fragmentary perspective view of the frame; and

Figure 12 is a longitudinal, substantially central sectional view of the seed planter attachment.

Figure 1:
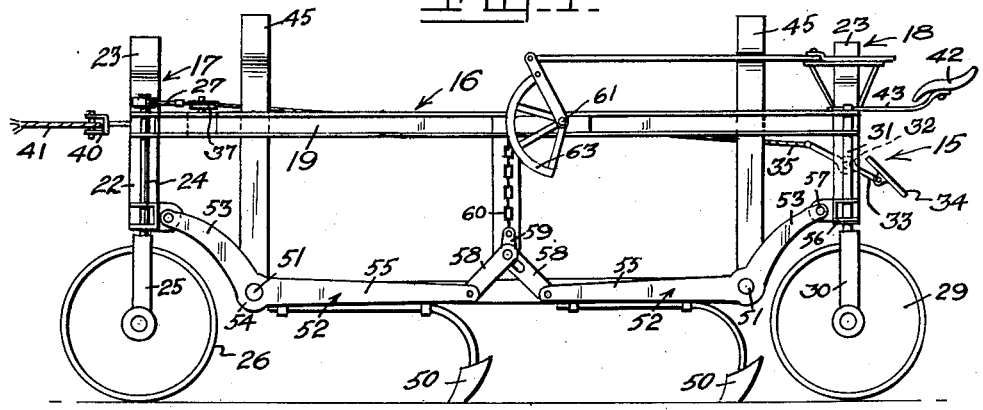
Figure 1 is a side elevational view of a single row embodiment of the invention shown supporting a plurality of plows in an operative position.
Figure 2:
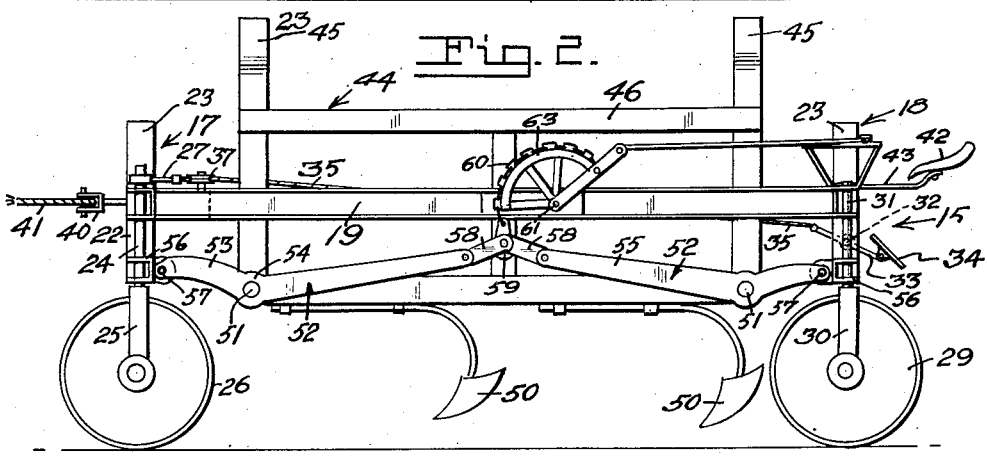
Figure 2 is a view similar to Figure 1 but showing the machine in an inoperative position.
Figure 3:
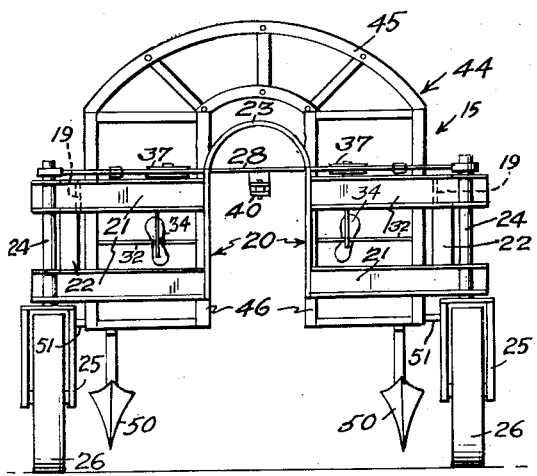
Figure 3 is a front elevational view thereof.
Figure 7:
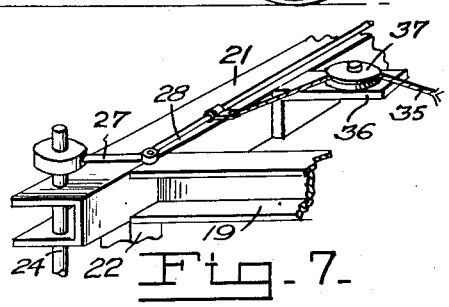
Figure 7 is a fragmentary perspective view on an enlarged scale and illustrating the upper left-hand corner of the chassis frame.

Referring more particularly to the drawings, the numeral 15 designates the improved agricultural or farm implement in its entirety as illustrated in Figures 1 to 4. The implement or machine 15 includes a chassis frame, designated generally 16 composed of a front section 17 and a rear section 18, which sections are connected at their ends by longitudinally extending side beams 19. As illustrated in Figure 3, the front and rear members 17 and 18, respectively, each preferably include a pair of laterally spaced frame portions 20, each comprising a pair of super-imposed, spaced, horizontally disposed channel members 21 which are connected at their outer ends by a vertical brace 22. An arch-shaped member 23 has one leg connecting the inner ends of one pair of the beams 21 and its other inner leg connecting said other pair of beams, said arch member 23 in addition functioning to maintain the front portions 20 in properly spaced relationship to one another.

A shaft 24 is journaled in a vertical position adjacent the outer end of the front members 21 and said shafts 24 are provided on their lower ends with wheel forks 25 which depend from the front portions 20 and in each of which is journaled a front ground engaging wheel 26. As best seen in Figure 4, a crank arm 27 is fixed to and projects forwardly from the upper end of each of the shafts 24; said crank arms 27 being disposed in alignment with the wheels 26, and being connected at their outer ends by a link or rod 28.

A pair of rear ground engaging wheels 29 are similarly mounted by forks 30 which depend from perpendicular rods 31, which are similarly located with respect to the rear chassis frame portion 18; however, the rods 31 are fixed in the frame portion 18.

The rear frame portion 18 is also provided with a pair of horizontally disposed rods or pins 32 which are mounted in the side members 19 thereof and each of which pivotally supports a lever 33, as seen in Figure 2, which is pivotally mounted intermediate of its ends thereon. A foot pedal 34 is pivotally connected to the rear end of each lever 33 and the opposite, forward ends of the levers 33 are connected to the ends of steering cables 35, which, as seen at Figure 4, are trained over idler guide pulleys 37, carried by brackets 36 attached to channel members 21, and attached at their opposite ends to the rod 28 at equally spaced points. It will thus be readily apparent that a downward pressure on the right-hand foot pedal 34, looking from rear to front of the machine, will exert a pull on the cable 35, connected thereto, to move rod 28 to the left and turn the wheels 26 in a clockwise direction, as seen in Figure 4. Conversely, a downward pressure on the other pedal 34 will turn the wheels 26 in the opposite or in a counter-clockwise direction.

A draw cable 38 is connected to a bracket 39 of the rear frame portion 18 and extends forwardly to beyond the front of the machine 15 and is provided at its forward end with a coupling 40 which is shown connected to an end of a cable 41. The cable 41 may be connected to any suitable draft means such as a tractor or team of horses for pulling the machine 15 through a field.

An operator's seat 42 is supported by and behind the rear frame portion 18 by members 43 and is disposed so that a person sitting thereon can conveniently rest his feet on the pedals 34.

An implement supporting frame, designated generally 44 which is generally of arch-shape construction, looking from front to rear thereof, as seen in Figure 3, includes an upper arcuate bridge portion 45 from the ends of which depend corresponding side portions 46. One of said bridge portions 45 is located at each end of the frame 44 and said side portions 46 extend from end to end of the frame 44 and are each connected to the two bridge portions 45 which, therefore, provide means for retaining the side portions 46 in laterally spaced apart relationship. As best illustrated in Figures 4 and 11, each of the side portions 46, at the bottom thereof, is provided with a forward, intermediate and rear transversely disposed supporting bar 47. Each of the bars 47 is provided with a plurality of openings for receiving nut and bolt fastenings 48. The nut and bolt fastenings 48 attach beams 49 to each of the side members 46 and said beams 49 are provided with depending rear ends to which are attached plows 50. As illustrated in Figure 4, two beams 49 and two plows 50 are mounted by each of the side members 46.

The side members 46 are provided with outwardly projecting stub shafts 51 at their ends on each of which stub shaft is journaled a lever 52. As best illustrated in Figure 10, the levers 52 are each provided with a short arcuate arm 53 projecting in one direction from the shaft receiving portion 54 and a long straight arm 55, which projects in the opposite direction. Each of the shafts 24 and 31 supports a yoke 56 to which the free end of a lever arm 53 is pivotally connected by a pivot pin 57. The yokes 56 are swivelly engaged with the shafts 24 and preferably fixed to the shafts 31. As seen in Figures 1 and 2, the shaft receiving portions 54 are journaled on the stub shafts 51 and the lever arms 55 extend toward the center or intermediate portion of the machine 15 and each is pivotally connected at its free end to one end of a link 58. The opposite ends of the links 58, located on the same side of the machine 15, are pivotally connected in overlapping relationship to the lower end of a link or plate 59 which is connected at its upper end to one end of a chain or flexible cable 60. As best illustrated in Figure 6, a shaft 61 is journaled adjacent its ends in the two side members 19 of the chassis frame 16 and a lever arm 62 is keyed to and projects laterally from each end of the shaft 61 and on the outer side of the frame 16. An arcuate channel member 63, provided with a brace 64, is connected to each lever arm 62. The channel members 63 receive the opposite ends of the chain 60 which are anchored to the upper ends thereof at 65. As best illustrated in Figure 6, an operating lever 66 is pivotally supported intermediate of its ends on a stand 67 which is secured to one side of the rear chassis frame portion 18. A link 68 has one end pivoted to the free end of the lever 62 and its opposite end pivotally connected to one end of the lever 66. An arcuately shaped toothed latch plate 69 is supported by brackets 70 which are secured to the rear frame portion 18 and provides a rest over which a portion of the opposite end of the lever 66 is movable. Said last mentioned end of the lever 66 is provided with a reciprocally mounted latch bolt 71 which is releasable by a spring pressed, pivotally mounted operating handle 72 which is supported on and disposed adjacent the terminal of the last mentioned end of the lever 66.

Assuming that the machine 15 is assembled, as heretofore described, equipped with four plow beams 49 and plows 50, as illustrated in Figure 4, and assuming that the plows 50 are in elevated positions out of engagement with the ground, as seen in Figure 2, the operator seated on the seat 42 is in position to grasp the handle end of the lever 66 to release the latch bolt 71 by its operator 72, after which by swinging the handle end of the lever 66 rearwardly the link 68 and the members 62 and 63 will be moved forwardly and downwardly, respectively to thereby permit the lever ends 55 to swing downwardly to their positions of Figure 1, thus lowering the plows 50 into engagement with the ground. The extent of the penetration of the plows 50 into the soil may of course be regulated by the extent to which the handle end of the lever 66 is swung rearwardly and upon release of the latch operator 72, the latch bolt 71 will return into engagement with a notch of the latch plate 69 for retaining the plows at the desired operating level. From a consideration of Figures 1 and 2 it will be readily apparent that as the chains 60 are permitted to be drawn downwardly by the weight of the implement frame 44 exerted on the lever ends 55, the lever ends 53 will move from their positions of Figure 2 to their positions of Figure 1 thus permitting the downward sliding movement of the implement frame 44, which carries the plows 50. Conversely, by swinging the handle end of the lever 66 forwardly the channel members 63 will be swung upwardly to raise the chains 60 and the lever ends 55 for returning the frame 44 from its operative position of Figure 1 to its raised, inoperative position of Figure 2. It will thus be readily apparent that the implement supporting frame 44 is mounted on the machine 15 entirely free of its chassis frame 16 and supported solely by the ground wheels through connection with the levers 52, thus permitting free vertical movement of the implement frame 44 with respect to the chassis frame 16.

It will also be readily apparent that the foot pedals 34 are located convenient to the feet of the operator seated upon the seat 42 and by a pressure on one or the other of the foot pedals 34, as previously described in detail, the machine 15 can be steered by means of the front wheels 26 for maintaining it in correct relationship to crop rows.

As best illustrated in Figure 3, the machine 15 is provided with a centrally disposed arch which extends from front to rear thereof providing a space through which growing plants may pass as the machine 15 moves thereover; and the plows 50 are located so as to cultivate the plant row at either side thereof.

In Figure 5 a farm machine, designated generally 73 of substantially the same construction as the machine 15 is illustrated. The machine 73 differs from the machine 15 only in that the front and rear chassis portions 74 and 75, respectively, thereof are made wider and are provided with a double arch. The implement supporting frame, designated generally 75 of the machine 73 is likewise provided with a double arch and with three depending, laterally spaced implement sections 76 which are disposed in longitudinal alignment with the three, laterally spaced sections 77 of the front and rear portions 74. Thus, the machine 73 is provided with two longitudinal passages each capable of accommodating a plant row over which the machine 73 is passing; and the implement frame 75 is equipped to support three sets of plows 50, each including two plows depending from each implement section 76, and which are arranged to cultivate between and on the outer sides of said two plant rows. The steering mechanism and the means for elevating and depressing the implement supporting frame 75 are identical with such means, as previously described, of the machine 15 and will therefore not be again described in detail. The machine 73, as illustrated in Figure 5, is intended to illustrate one of a plurality of multiple row cultivating and planting machines, and it is to be understood that similar constructed machines can be built for simultaneously cultivating three, four or more plant rows.

It is also to be understood that other soil engaging implements could be substituted for the plows 50, including disc cultivators or any other cultivators or soil engaging implements for preparing seed beds, planting or the like.

In Figure 12 a planter, designated generally 78 is illustrated which is adapted to be supported by the fastenings 48 in lieu of the plow beams 49 and the plows 50 carried thereby. The planter 78 includes a supporting plate 79 provided with openings 80, adjacent the ends thereof, for receiving the fastenings 48 for mounting the planter 78 detachably upon the supporting members 47. A hopper 81 is supported on the plate 79 intermediate of its ends and is provided with a depending outlet 82. A seed dispensing disc or wheel 83 is rotatably mounted in the hopper 81 and keyed to a shaft 84 which extends through the hopper and which is equipped with a pulley 85, on one end thereof and disposed exteriorly of the hopper 81. The wheel 83 protrudes into the restricted upper portion of the outlet 82 and is provided with a plurality of circumferentially spaced, seed receiving recesses 86 in the periphery thereof. A seed agitating wheel 87 is journaled on a shaft 88 within the hopper 81 and above and in contact with the seed dropping wheel 83, to be revolved thereby to agitate the seed, not shown, and to effect a correct distribution thereof into the seed receiving recesses 86. A standard 89 depends from the forward portion of the supporting plate 79 and carries a plow 90, on its lower end, which provides a main furrow opener. A disc or wheel 91, provided with an annular tapered peripheral portion 92 is journaled on an axle 93 which is supported by a standard 94. The standard 94 extends slidably through the plate 79 and through a collar 95 thereon and is provided with longitudinally spaced apertures 96 for selectively receiving a pin 97, which extends into the collar 95, for adjusting the elevation of the wheel 91. The wheel 91 is disposed between the plow 90 and the hopper outlet 82 and is provided to open a seed furrow within the main furrow, opened by plow 90. The wheel 91 is illustrated in detail in Fig. 9. A seed covering wheel 98, best seen in Figure 8, formed of spaced disc sections having inwardly bevelled peripheral portions 99, is keyed on an axle 100 which is journaled in a fork 101, which depends from the plate 79, behind the hopper outlet 82. Axle 100 carries a pulley 102, keyed thereto, over which pulley and the pulley 85 is trained an endless belt 103.

From the foregoing it will be readily apparent that one of the seed planting units 78 can be mounted on each implement frame section 46 or 76 and adjustably supported thereby for planting a row of seeds in a field as the machine 15 or 73 moves thereover. It will be readily apparent that the wheel 98 is driven by engagement with the ground for the dual purpose of driving the distributor wheel 83 and for covering the seed furrows, opened by the wheel 91, to thereby cover the seeds to a uniform depth thus insuring a uniform stand of crops.

The ground wheels 26 and 29 are provided with anti-friction bearings, not shown, and the chassis frames and implement frames of the machines 15 and 73 are connected together by rivets to produce a construction which will not become loosened as a result of vibration incident to frequent use.

Numerous other modifications and changes are contemplated and may obviously be resorted to without departing from the spirit and scope of the invention as hereinafter defined by the appended claims.

I claim:

1. In a farm machine, a substantially rectangular vehicle frame provided with supporting ground engaging wheels, an implement supporting frame disposed within the vehicle frame and freely movable with respect thereto, a lever pivotally mounted intermediate of its ends at each corner of said implement frame, said lever having outer ends pivotally connected to the corners of the vehicle frame, and manually actuated hoisting means connected to the inner, adjacent end of the levers for raising said inner end for elevating the implement supporting frame within the vehicle frame, said implement supporting frame being lowered by gravity upon release of the hoisting means.

2. In a farm machine, a substantially rectangular vehicle frame provided with supporting ground engaging wheels, an implement supporting frame disposed within the vehicle frame and freely movable with respect thereto, a lever pivotally mounted intermediate of its ends at each corner of said implement frame, said lever having outer ends pivotally connected to the corners of the vehicle frame, and manually actuated hoisting means connected to the inner, adjacent end of the levers for raising said inner end for elevating the implement supporting frame within the vehicle frame, said implement supporting frame being lowered by gravity upon release of the hoisting means, and manually controlled means for latching the implement frame at a plurality of levels with respect to the vehicle frame.

3. In a farm machine, a substantially rectangular vehicle frame provided with supporting ground engaging wheels, an implement supporting frame disposed within the vehicle frame and freely movable with respect thereto, a lever pivotally mounted intermediate of its ends at each corner of said implement frame, said lever having outer ends pivotally connected to the corners of the vehicle frame, and manually actuated hoisting means connected to the inner, adjacent end of the levers for raising said inner end for elevating the implement supporting frame within the vehicle frame, said implement supporting frame being lowered by gravity upon release of the hoisting means, said vehicle frame and implement supporting frame being provided with a centrally disposed arch extending from front to rear of the machine.

4. In a farm machine, a substantially rectangular vehicle frame provided with supporting ground engaging wheels, an implement supporting frame disposed within the vehicle frame and freely movable with respect thereto, a lever pivotally mounted intermediate of its ends at each corner of said implement frame, said lever having outer ends pivotally connected to the corners of the vehicle frame, and manually actuated hoisting means connected to the inner, adjacent end of the levers for raising said inner end for elevating the implement supporting frame within the vehicle frame, said implement supporting frame being lowered by gravity upon release of the hoisting means, said hoist means including linkage units connected to the adjacent ends of said levers, disposed on each side of the implement frame, a shaft journaled in the vehicle frame, wheel segments keyed to the shaft, flexible members connected to the wheel segments and to said linkage units, and manually actuated means for turning said shaft for raising and lowering the flexible members.

5. In a farm machine, a substantially rectangular vehicle frame provided with supporting ground engaging wheels, an implement supporting frame disposed within the vehicle frame and freely movable with respect thereto, a lever pivotally mounted intermediate of its ends at each corner of said implement frame, said lever having outer ends pivotally connected to the corners of the vehicle frame, and manually actuated hoisting means connected to the inner, adjacent end of the levers for raising said inner end for elevating the implement supporting frame within the vehicle frame, said implement supporting frame being lowered by gravity upon release of the hoisting means, said vehicle frame and implement supporting frame being provided with a centrally disposed arch extending from front to rear of the machine, said implement frame being provided with a plurality of laterally spaced, depending frame portions, and each of said frame portions being provided with a plurality of transversely disposed implement supporting members adapted to support a plurality of ground engaging implements.

DOCK C. BOREN.

REFERENCES CITED

The following references are of record in the file of this patent:

UNITED STATES PATENTS

| Number | Name | Date |
|---|---|---|
| 1,100,313 | Leischner | June 16, 1914 |
| 1,114,940 | Trompeter | Oct. 27, 1914 |
| 1,250,329 | Le Fever | Dec. 18, 1917 |
| 1,475,710 | Meszaros | Nov. 27, 1923 |
| 1,582,781 | Prenosil | Apr. 27, 1926 |
| 2,026,887 | Gossett | Jan. 7, 1936 |
| 2,228,558 | Childerss | Jan. 14, 1941 |